(12) United States Patent
Tokashiki et al.

(10) Patent No.: US 8,040,661 B2
(45) Date of Patent: Oct. 18, 2011

(54) SOLID ELECTROLYTIC CAPACITOR DEVICE AND MANUFACTURING METHOD OF THE SAME

(75) Inventors: Shinya Tokashiki, Sendai (JP); Katsuhiro Yoshida, Sendai (JP); Masanori Takahashi, Sendai (JP)

(73) Assignee: NEC Tokin Corporation, Sendai-Shi, Miyagi (JP)

( * ) Notice: Subject to any disclaimer, the term of this patent is extended or adjusted under 35 U.S.C. 154(b) by 387 days.

(21) Appl. No.: 12/410,569

(22) Filed: Mar. 25, 2009

(65) Prior Publication Data

US 2009/0244814 A1 Oct. 1, 2009

(30) Foreign Application Priority Data

Mar. 25, 2008 (JP) .................................. 2008-076998
Oct. 20, 2008 (JP) .................................. 2008-269580

(51) Int. Cl.
*H01G 9/042* (2006.01)

(52) U.S. Cl. ........ 361/529; 361/516; 361/519; 361/523; 361/525; 361/528

(58) Field of Classification Search .................. 361/529, 361/516, 519, 523–525, 528, 530–534, 540–541, 361/509–512; 29/25.01, 25.03
See application file for complete search history.

(56) References Cited

U.S. PATENT DOCUMENTS

| | | | |
|---|---|---|---|
| 5,638,253 A | 6/1997 | Hasegawa | |
| 6,236,561 B1 * | 5/2001 | Ogino et al. | 361/523 |
| 6,519,135 B2 * | 2/2003 | Sano et al. | 361/510 |
| 7,057,882 B2 * | 6/2006 | Fujii et al. | 361/540 |
| 7,215,533 B2 * | 5/2007 | Kurita et al. | 361/523 |
| 7,277,271 B2 * | 10/2007 | Yamaguchi et al. | 361/523 |
| 2009/0067120 A1 | 3/2009 | Matumoto | |

FOREIGN PATENT DOCUMENTS

| | | |
|---|---|---|
| EP | 1 876 613 A1 | 1/2008 |
| JP | 63-283012 A | 11/1988 |
| JP | 9-283376 A | 10/1997 |
| JP | 11-251189 A | 9/1999 |
| JP | 2001-267181 A | 9/2001 |
| JP | 2006-41447 A | 2/2006 |
| JP | 2007-173559 A | 7/2007 |
| JP | 2007-184308 A | 7/2007 |

OTHER PUBLICATIONS

Extended European Search Report dated Jun. 29, 2009 (7 pages), issued in counterpart European Application Serial No. 09155862.7.

* cited by examiner

*Primary Examiner* — Nguyen T Ha
(74) *Attorney, Agent, or Firm* — Holtz, Holtz, Goodman & Chick, P.C.

(57) ABSTRACT

A method for manufacturing a solid electrolytic capacitor device is disclosed. The solid electrolytic capacitor device comprises a package substrate and a capacitor element which is mounted on the package substrate. The package substrate comprises an outer anode electrode, an outer cathode electrode, an inner anode electrode and an inner cathode electrode. The outer anode electrode is electrically connected to the inner anode electrode. The outer cathode electrode is electrically connected to the inner cathode electrode. The capacitor element comprises a capacitor body and an anode lead portion which extends from the capacitor body. The capacitor body has a surface at least one part of which is provided with a cathode portion. The method comprises: forming the anode lead portion; forming the cathode portion after the formation of the anode lead portion; and connecting the anode lead portion and the cathode portion to the inner anode electrode and the inner cathode electrode, respectively.

18 Claims, 3 Drawing Sheets

SOLID ELECTROLYTIC CAPACITOR DEVICE AND MANUFACTURING METHOD OF THE SAME

CROSS REFERENCE TO RELATED APPLICATIONS

Applicants claim priority under 35 U.S.C. §119 of Japanese Patent Applications Nos. JP2008-076998 filed Mar. 25, 2008 and JP2008-269580 filed Oct. 20, 2008.

BACKGROUND OF THE INVENTION

This invention relates to a solid electrolytic capacitor device and a method for manufacturing the same.

There have been proposed various kinds of solid electrolytic capacitor devices each of which comprises an aluminum anode member. For example, JP-A H09(1997)-283376 or JP-A 2001-267181 discloses an aluminum solid electrolytic capacitor device, the contents of those documents being incorporated herein by reference in their entireties.

The solid electrolytic capacitor device of JP-A 2001-267181 comprises a package substrate and a capacitor element mounted on the package substrate. The capacitor element comprises a capacitor body and an anode lead portion which extends from the capacitor body. The capacitor body has a surface at least one part of which is provided with a cathode portion. However, the capacitor body of the disclosed solid electrolytic capacitor device may have defects.

SUMMARY OF THE INVENTION

It is an object of the present invention to provide a method for manufacturing a solid electrolytic capacitor device which has reduced defects.

One aspect of the present invention provides a method for manufacturing a solid electrolytic capacitor device. The solid electrolytic capacitor device comprises a package substrate and a capacitor element which is mounted on the package substrate. The package substrate comprises an outer anode electrode, an outer cathode electrode, an inner anode electrode and an inner cathode electrode. The outer anode electrode is electrically connected to the inner anode electrode. The outer cathode electrode is electrically connected to the inner cathode electrode. The capacitor element comprises a capacitor body and an anode lead portion which extends from the capacitor body. The capacitor body has a surface at least one part of which is provided with a cathode portion. The method comprises: forming the anode lead portion; forming the cathode portion after the formation of the anode lead portion; and connecting the anode lead portion and the cathode portion to the inner anode electrode and the inner cathode electrode, respectively.

An appreciation of the objectives of the present invention and a more complete understanding of its structure may be had by studying the following description of the preferred embodiment and by referring to the accompanying drawings.

Figure 1A:
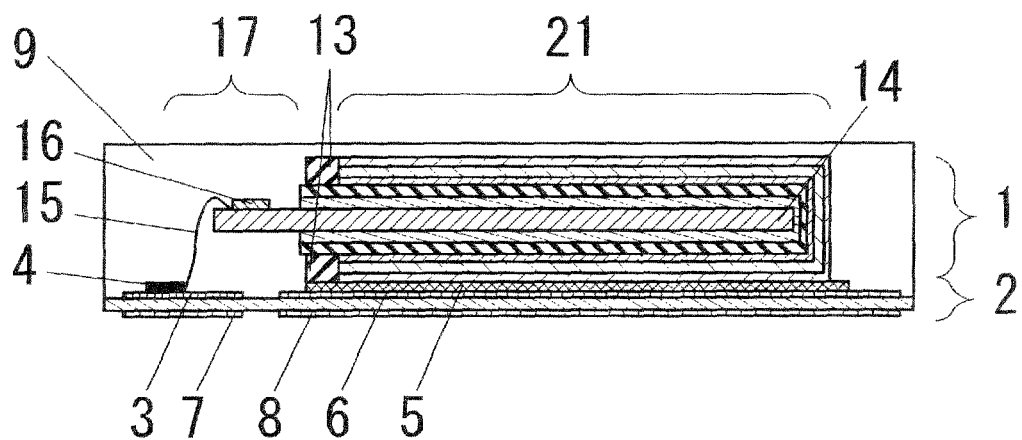
FIG. 1A is a cross-sectional view showing a solid electrolytic capacitor device according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives failing within the spirit and scope of the present invention as defined by the appended claims.

DESCRIPTION OF PREFERRED EMBODIMENTS

First Embodiment

Figure 1B:
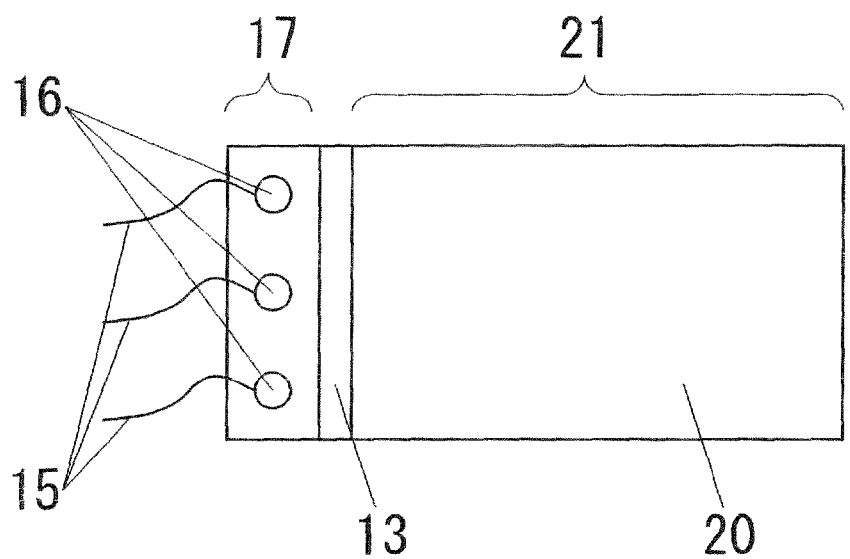
FIG. 1B is a top plan view showing a capacitor element included in the solid electrolytic capacitor device of FIG. 1A.
Figure 1C:
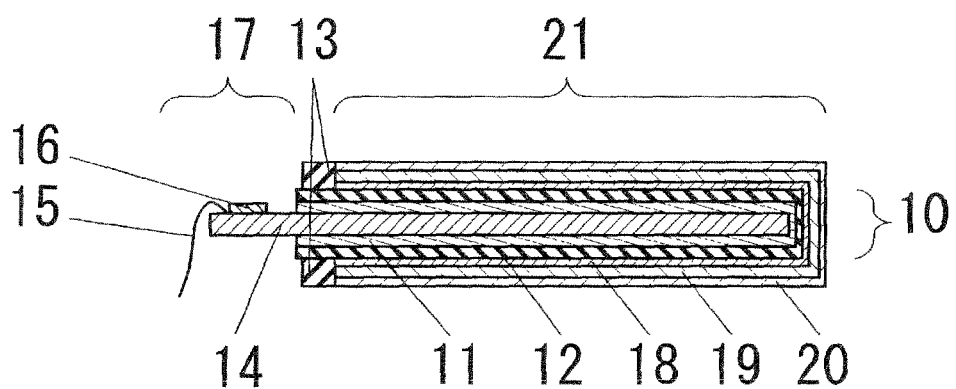
FIG. 1C is a cross-sectional view showing the capacitor element of FIG. 1B.

With reference to FIGS. 1A to 1C, a solid electrolytic capacitor device according to a first embodiment of the present invention comprises a package substrate or interpose substrate 2 and a capacitor element 1 mounted on the package substrate 2.

As shown in FIG. 1A, the package substrate 2 comprises an outer anode electrode 7, an outer cathode electrode 8, an inner anode electrode 3 and an inner cathode electrode 6. The outer anode electrode 7 and the outer cathode electrode 8 are electrically connected to the inner anode electrode 3 and the inner cathode electrode 6, respectively, although those connections are not shown in FIG. 1A.

As shown in FIGS. 1A to 1C, the capacitor element 1 comprises a capacitor body 21, an anode lead portion 17 and dividers 13. The capacitor body 21 and the anode lead portion 17 are separated by the dividers 13, as seen from the above (See FIG. 1B). The dividers 13 of the present embodiment are made of insulator resin such as epoxy resin. The anode lead portion 17 extends from the capacitor body 21, as shown in FIGS. 1A and 1C. The anode lead portion 17 is connected to the inner anode electrode 3 at connection portions 4, as described later. The capacitor body 21 has a surface which is provided with a cathode portion 20. The cathode portion 20 is connected to the inner cathode electrode 6 by a conductive adhesive 5, as described later.

The capacitor body 21 has a low-profile block shape and comprises an anode member 10. The anode member 10 comprises an aluminum base 14, a large-sized surface layer 11, a dielectric coat 12. The aluminum base 14 is an aluminum film and is used as a valve metal in this embodiment. The large-sized surface layer 11 is formed on a part of the aluminum base 14. The dielectric coat 12 of this embodiment is an oxide coat and is formed on the large-sized surface layer 11. The capacitor body 21 further comprises a solid electrolyte layer 18, a graphite layer 19 and a cathode portion 20. The solid electrolyte layer 18 of this embodiment is made of a conductive polymer and is formed on the dielectric coat 12. The graphite layer 19 is formed on the solid electrolyte layer 18. The cathode portion 20 of this embodiment is made of metal material such as conductive paste.

The anode lead portion 17 of the present embodiment comprises a part of the aluminum base 14 and aluminum wires 15. The aluminum wires 15 are connected to the aluminum base 14 at connection portions 16, respectively, by a wedge bonding process. The aluminum wires 15 are connected to the inner anode electrode 3 at the respective connection portions 4 by a lead-bonding process. The number of the aluminum wires 15, the number of the connection portions 16 and the number of the connection portions 4 are not limited to the present embodiment.

Next explanation is made about the manufacturing method of the above-mentioned solid electrolytic capacitor device.

First, an aluminum film is cut to obtain the aluminum base 14. Surfaces of the aluminum base 14 are etched so that the aluminum base 14 is provided with the large-sized surface layer 11. The large-sized surface layer 11 is subjected to a chemical conversion process or chemical oxidation process so that the large-sized surface layer 11 is provided with the dielectric coat 12. Thus, the anode member 10 is obtained.

The dividers 13 are formed on predetermined portions of the dielectric coat 12 to divide the anode member 10 into first and second regions, wherein the first region corresponds to the capacitor body 21, while the second region corresponds to a part of the anode lead portion 17.

The large-sized surface layer 11 on the second region and the dielectric coat 12 on the second region are removed, for example, by using a laser device so that a part of the aluminum base 14 is exposed. The aluminum wires 15 are connected to the exposed part of the aluminum base 14 by a wedge bonding process so that the connection portions 16 are formed. Thus, the anode lead portion 17 is obtained.

Note that the cathode portion 20 is not formed at this stage. In other words, the formation of the capacitor body 21 is not completed at the time when the anode lead portion 17 is formed. The wedge bonding process has a size-reduction advantage over other processes such as ultrasonic welding process and resistance welding process. On the other hand, the wedge bonding process applies a stress on the anode member 10. If the anode lead portion is formed after the completion of the capacitor body as the conventional technique, the wedge bonding process may damage the capacitor body; in case where the capacitor body is damaged, it is very difficult to recover the capacitor body in the following processes; the damage causes a leak current problem. However, the anode lead portion 17 is formed before the completion of the capacitor body 21 in accordance with the present embodiment so that, if the wedge bonding process may damage the anode member 10, it is easy to recover the anode member 10, for example, by an additional chemical conversion process or additional chemical oxidation process as explained below.

The additional chemical conversion process is carried out so that the anode lead portion 17, i.e. the exposed part of the aluminum base 14 and the aluminum wires 15, and end surfaces of the anode member 10 are provided with additional dielectric coats (not shown). Upon the additional chemical conversion process, the dielectric coat 12 is also cured so that, if the wedge bonding process damages the dielectric coat 12, the additional chemical conversion process recovers the dielectric coat 12.

After the additional chemical conversion process, the solid electrolyte layer 18, the graphite layer 19 and the cathode portion 20 are formed in this order on the first region of the dielectric coat 12 by screen printing processes so that the formation of the capacitor body 21 is completed. Thus, the capacitor element 1 is obtained.

The additional dielectric coat formed at ends of the aluminum wires 15 are removed, for example, by using a laser device. Then, the ends of the aluminum wires 15 are connected to the inner anode electrode 3 of the package substrate 2 so that the connection portions 4 are formed. On the other hand, the cathode portion 20 is connected to the inner cathode electrode 6 by using the conductive adhesive 5. The insulator 9 such as resin is applied to the package substrate 2 and the capacitor element 1 so that the outer anode electrode 7 and the outer cathode electrode 8 are exposed, at least in part, while the capacitor element 1 is packed and covered by the insulator 9. Thus, the solid electrolytic capacitor device of the present embodiment is obtained.

Second Embodiment

Figure 2A:
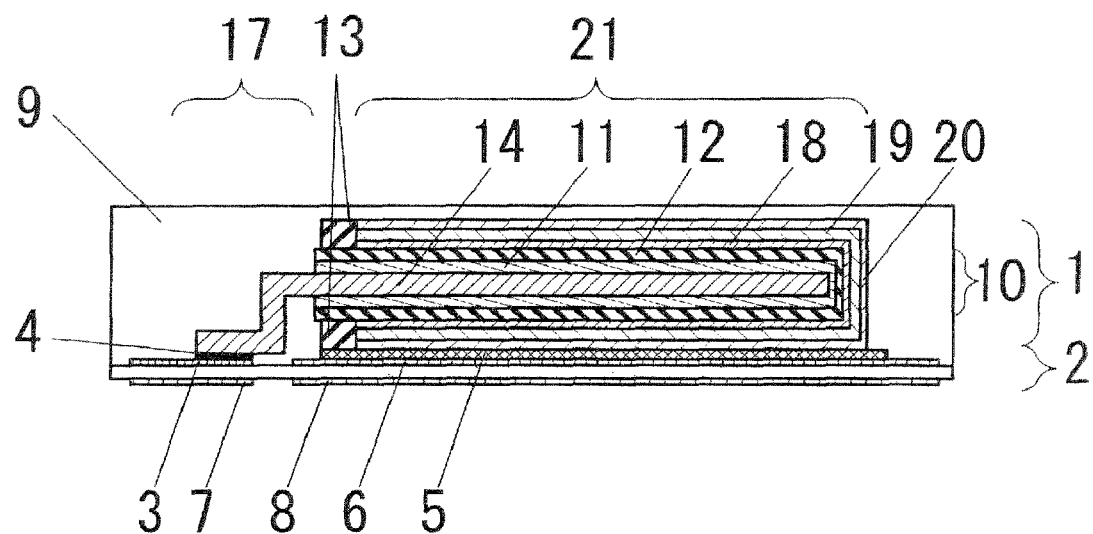
FIG. 2A is a cross-sectional view showing a solid electrolytic capacitor device according to a second embodiment of the present invention.
Figure 2B:
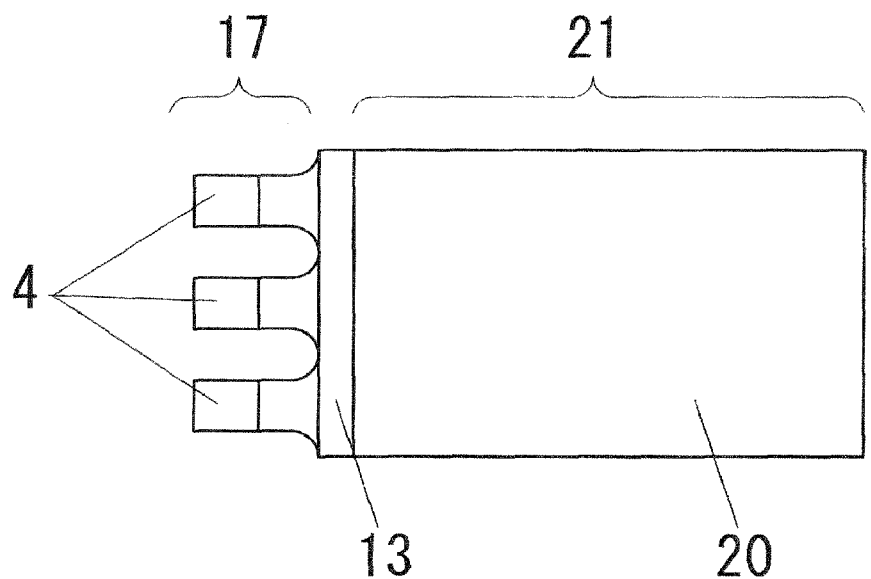
FIG. 2B is a top plan view showing a capacitor element included in the solid electrolytic capacitor device of FIG. 2A.

With reference to FIGS. 2A and 2B, a solid electrolytic capacitor device according to a second embodiment of the present invention is a modification of the above-mentioned solid electrolytic capacitor device of the first embodiment. Therefore, in FIGS. 2A and 2B, the same reference numbers are given to the structures same as or similar to those of the solid electrolytic capacitor device of the first embodiment; the description therefor is omitted.

As shown in FIGS. 2A and 2B, the anode lead portion 17 of the present embodiment essentially consists of a part of the aluminum base 14 without using aluminum wires or other members.

The solid electrolytic capacitor device of this embodiment is manufactured as follows.

The anode member 10 is formed in a manner as explained in the first embodiment. Then, the dividers 13 are formed to divide the anode member 10 into the first and the second regions. The size of the second region according to the present embodiment is larger than that of the first embodiment.

The large-sized surface layer 11 on the second region and the dielectric coat 12 on the second region are removed to expose a part of the aluminum base 14. Thus, the anode lead portion 17 essentially consisting of the exposed part of the aluminum base 14 is obtained. After the formation of the anode lead portion 17, the formation of the capacitor body 21 is completed.

Then, the anode lead portion 17 is connected to the inner anode electrode 3 at the connection portions 4 by a lead-bonding process, while the cathode portion 20 is connected to the inner cathode electrode 6. Then, the insulator 9 is applied thereto so that the solid electrolytic capacitor device of this embodiment is obtained.

Third Embodiment

Figure 3A:
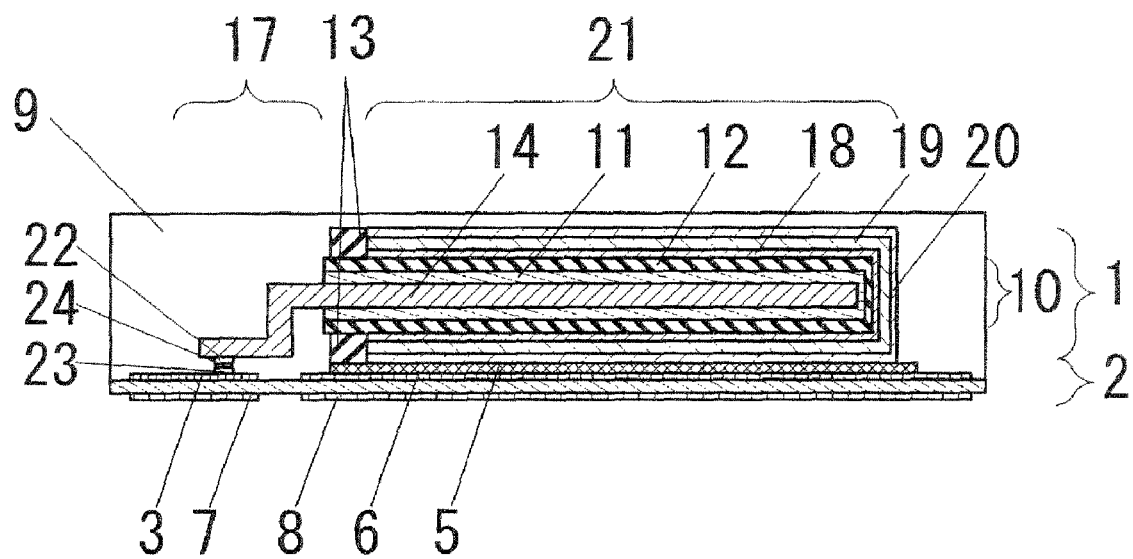
FIG. 3A is a cross-sectional view showing a solid electrolytic capacitor device according to a third embodiment of the present invention.
Figure 3B:
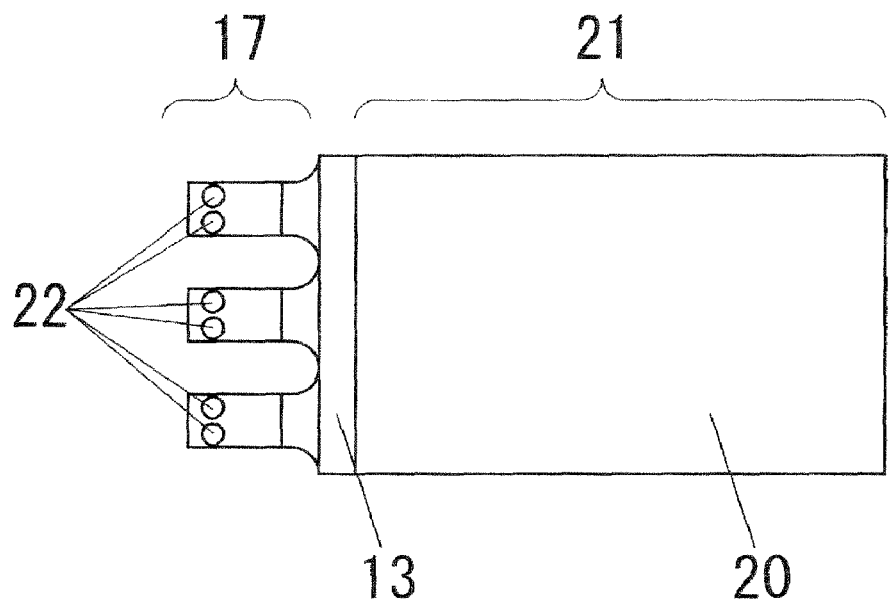
FIG. 3B is a bottom plan view showing a capacitor element included in the solid electrolytic capacitor device of FIG. 3A.

With reference to FIGS. 3A and 3B, a solid electrolytic capacitor device according to a third embodiment of the present invention is a modification of the above-mentioned solid electrolytic capacitor device of the second embodiment. Therefore, in FIGS. 3A and 3B, the same reference numbers are given to the structures same as or similar to those of the solid electrolytic capacitor device of the second embodiment; the description therefor is omitted.

As shown in FIGS. 3A and 3B, the anode lead portion 17 of the present embodiment essentially consists of a part of the aluminum base 14. In addition, metal bumps 22, 23 are provided for connection between the anode lead portion 17 and the inner anode electrode 3.

The solid electrolytic capacitor device of the present embodiment is manufactured as follows.

The anode member 10 is formed in a manner as explained in the first embodiment. Then, the dividers 13 are formed to divide the anode member 10 into the first and the second regions. The size of the second region according to the present embodiment is larger than that of the first embodiment.

The large-sized surface layer 11 on the second region and the dielectric coat 12 on the second region are removed to expose a part of the aluminum base 14. On the lower side of the exposed part of the aluminum base 14, the metal bumps 22 are formed. Thus, the anode lead portion 17 essentially consisting of the exposed part of the aluminum base 14 is obtained. After the formation of the anode lead portion 17, the formation of the capacitor body 21 is completed.

On the other hand, the package substrate 2 of the present embodiment is processed so that the metal bumps 23 are formed on the inner anode electrode 3.

Then, the anode lead portion 17 is connected to the inner anode electrode 3 by a lead-bonding process by using the metal bumps 22, 23 so that connection portions 24 are formed, as shown in FIG. 3A. On the other hand, the cathode portion 20 is connected to the inner cathode electrode 6. Then, the insulator 9 is applied thereto so that the solid electrolytic capacitor device of this embodiment is obtained.

In this embodiment, the anode lead portion 17 and the inner anode electrode 3 are provided with the metal bumps 22, 23, respectively. However, the present invention is not limited thereto. Only one of the anode lead portion 17 and the inner anode electrode 3 may be provided with metal bumps.

The metal bumps 22, 23 may be made of aluminum or gold. In case of the aluminum bumps, it is preferable that the aluminum bumps are formed by a wedge bonding process. In case of the gold bumps, it is preferable that the gold bumps are formed by a ball bonding process.

EXAMPLES

For evaluation of the above-mentioned embodiments, three types of examples and two types of comparative examples were manufactured and were analyzed. Examples 1 to 3 correspond to the first to the third embodiment of the present invention.

Example 1

An aluminum film for aluminum solid electrolytic capacitor device was prepared as a mother material of the anode member 10. The formation of the dielectric coat 12 in the aluminum film was carried out under a nominal voltage of 4V. The aluminum film had a capacitance of 295 µF/cm$^2$ and a thickness of 105 µm.

The aluminum film was cut so that the anode member 10 of 2.5 mm×5.0 mm was obtained. On the anode member 10, the dividers 13 were formed so that the anode member 10 was divided into the first and the second regions. Each divider 13 was made of epoxy resin and had a width of 0.5 mm and a thickness of 15 µm. As the result of the division, the first region had a rectangular shape of 2.5 mm×4.0 mm, while the second region had a rectangular shape of 2.5 mm×0.5 mm.

The large-sized surface layer 11 on the second region and the dielectric coat 12 on the second region were removed by a laser process so that a part of the aluminum base 14 was exposed, wherein the power of the laser device was 15 W.

Each of the aluminum wires 15 had a diameter of 75 µm. Ends of the aluminum wires 15 were applied with laser beams of 10 W so that, from the ends, oxide coats were removed. The thus-processed aluminum wires 15 were connected to the exposed part of the aluminum base 14 so that the anode lead portion 17 was obtained.

The anode lead portion 17 and the anode member 10 were soaked in 10% diammonium adipate solution. In addition, 6V voltage was applied thereto so that the additional dielectric coats were formed on the exposed part of the aluminum base 14, the end surfaces of the anode member 10 and surfaces of the aluminum wires 15.

The solid electrolyte layer 18 of 10 µm thickness was formed on the first region of the anode member 10, i.e. on the dielectric coat 12. The conductive polymer of the solid electrolyte layer 18 was obtained by mixing a monomer, an oxidizer and a dopant, wherein the monomer was 3,4-ethylenedioxythiophene, the oxidizer was ammonium peroxodisulfate, the dopant was p-toluenesulfonic acid, and the molar ratio of the monomer and the oxidizer and the dopant was 6:1:2. On the solid electrolyte layer 18, the graphite layer 19 of 15 µm thickness was formed by a screen printing process. On the graphite layer 19, a conductive paste layer of 30 µm thickness was formed. The conductive paste layer was made of the conductive paste which included silver of 80 wt % or more. The conductive paste layer was processed under a temperature of 150° C. As the result, an organic solvent was volatilized from the conductive paste layer, while the conductive paste layer was hardened so that the cathode portion 20 was formed. Thus, the capacitor body 21 was obtained.

The additional dielectric coats of the other ends of the aluminum wires 15 were removed by using a laser device of 10 W. Then, the other ends of the aluminum wires 15 were connected to the inner anode electrode 3 by a lead-bonding process. In this example, each of the inner anode electrode 3, the inner cathode electrode 6, the outer anode electrode 7 and the outer cathode electrode 8 was made of a copper layer of 18 µm thickness which was coated with 3 µm nickel-plating and 0.1 µm gold-plating. On the other hand, the conductive adhesive 5 of 40 µm thickness was applied to the cathode portion 20. Then, the cathode portion 20 was connected to the inner cathode electrode 6 by using the conductive adhesive 5. Epoxy resin was used as the insulator 9 so that the solid electrolytic capacitor device of Example 1 was obtained. The number of the devices in this example was ten.

Example 2

After a part of the aluminum base 14 was exposed in a similar manner to the manufacturing method of Example 1, the exposed part of the aluminum base 14 was processed by using a laser so that the exposed part of the aluminum base 14 had a comb-like shape as shown in FIG. 2B. The power of the laser was 50 W. The comb-like shaped part of the aluminum base 14 was used as the anode lead portion 17, as described above.

After the formation of the anode lead portion 17, the additional chemical conversion process was carried out. Then, the solid electrolyte layer 18, the graphite layer 19 and the cathode portion 20 were formed so that the formation of the capacitor body 21 was completed. After the formation of the capacitor body 21, the exposed part of the aluminum base 14 was connected as the anode lead portion 17 to the inner anode electrode 3 by a lead-bonding process, while the cathode portion 20 was connected to the inner cathode electrode 6. Thus, the capacitor device of Example 2 was obtained. The number of the devices in this example was ten. The similar analyses were carried out for the devices of Example 2.

Example 3

After the formation of the anode lead portion 17 essentially consisting of the exposed part of the aluminum base 14 in a similar manner to the manufacturing method of Example 2, the metal bumps 22 of aluminum were formed on the exposed part of the aluminum base 14 by a wedge bonding process. Then, additional chemical conversion process was carried out. Subsequently, the solid electrolyte layer 18, the graphite layer 19 and the cathode portion 20 were formed so that the formation of the capacitor body 21 was completed.

On the other hand, the metal bumps 23 of gold were formed on the inner anode electrode 3 by a ball bonding process. The anode lead portion 17 and the inner anode electrode 3 were connected to each other by a lead-bonding process, while the cathode portion 20 was connected to the inner cathode electrode 6. Thus, the capacitor device of Example 3 was obtained. The number of the devices in this example was ten. The similar analyses were carried out for the devices of Example 3.

Comparative Example 1

A solid electrolytic capacitor device of Comparative Example 1 comprised an anode lead portion which comprised a part of the aluminum base 14 and a copper lead frame. The copper lead frame was connected to the aluminum base 14 by an ultrasonic welding process. The welding process needed a size margin for the second region. Therefore, the first region of the anode member 10 was smaller than those of Examples 1 to 3.

Comparative Example 2

Outwardly, a solid electrolytic capacitor device of Comparative Example 2 had the same structure as that of Example 1. However, the device of Comparative Example 2 had different manufacturing processes. Upon the formation of the device of Comparative Example 2, the formation of the cathode portion 20 was carried out before the formation of the anode lead portion 17. In detail, the wedge bonding of the aluminum wires 15 to the exposed aluminum base 14 was carried out after the formation of the cathode portion 20.

Analyses

Analyses were carried out for Examples 1 to 3 and Comparative Examples 1 and 2, as for "Capacitance", "Equivalent Series Resistance (ESR)" and "Leak Current", wherein "Capacitance" and "ESR" were evaluated by AC impedance bridge method. Conditions for evaluation of "Capacitance" were: 120 Hz of a frequency of a reference signal used; 1 Vrms of a voltage of the reference signal; and 0 V of DC bias. As for "ESR", conditions were: 100 kHz of a frequency of a reference signal used 1 Vrms of a voltage of the reference signal; and 0 V of DC bias. "Leak Current" was evaluated by waiting 1 minute after applying the example devices with 2.5 V, which was a rated voltage of the device. Averages of the evaluation results are shown in Table 1.

TABLE 1

|  | Capacitance [μF] | ESR [μΩ] | Leak Current [μA] | Effective Area Size [mm$^2$] |
| --- | --- | --- | --- | --- |
| Example 1 | 23.6 | 8.8 | 11 | 10 |
| Example 2 | 23.5 | 8.7 | 12 | 10 |
| Example 3 | 23.5 | 8.7 | 12 | 10 |
| Comparative Example 1 | 20.3 | 10.0 | 11 | 8.75 |
| Comparative Example 2 | 23.6 | 8.7 | 20 | 10 |

As apparent from Table 1, Examples 1 to 3 are superior to Comparative Example 1 in "Capacitance" and "ESR". In detail, each of Examples 1 to 3 has a capacitance higher by over 10 percents than that of Comparative Example 1 but an ESR lower than that of Comparative Example 1.

In addition, Examples 1 to 3 are superior to Comparative Example 2 in "Leak Current". In detail, each of Examples 1 to 3 has a reduced leak current in comparison with Comparative Example 2.

The present application is based on Japanese patent applications of JP2008-076998 and JP2008-269580 filed before the Japan Patent Office on Mar. 25, 2008 and Oct. 20, 2008, respectively, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A method for manufacturing a solid electrolytic capacitor device, the solid electrolytic capacitor device comprising a package substrate and a capacitor element mounted on the package substrate, the package substrate comprising an outer anode electrode, an outer cathode electrode, an inner anode electrode and an inner cathode electrode, the outer anode electrode being electrically connected to the inner anode electrode, the outer cathode electrode being electrically connected to the inner cathode electrode, the capacitor element comprising a capacitor body and an anode lead portion extending from the capacitor body, the capacitor body having a surface at least one part of which is provided with a cathode portion, the method comprising:
  forming the anode lead portion;
  forming the cathode portion after the formation of the anode lead portion; and
  connecting the anode lead portion and the cathode portion to the inner anode electrode and the inner cathode electrode, respectively.

2. The method according to claim 1, wherein the anode lead portion is connected to the inner anode electrode by a lead-bonding process.

3. The method according to claim 1, wherein the anode lead portion is formed of aluminum.

4. The method according to claim 3, wherein the forming the anode lead portion comprises:
  etching an aluminum base to provide the aluminum base with a large-sized surface layer;
  carrying out a chemical conversion process for the large-sized surface layer to provide the large-sized surface layer with a dielectric coat;
  partially removing the large-sized surface layer and the dielectric coat to expose a part of the aluminum base; and
  connecting an aluminum wire to the exposed part of the aluminum base by a wedge bonding process to obtain the anode lead portion which comprises the exposed part of the aluminum base and the aluminum wire.

5. The method according to claim 4, wherein the formation of the cathode portion is carried out so that the cathode portion is formed on the dielectric coat of the large-sized surface layer.

6. The method according to claim 3, wherein the forming the anode lead portion comprises:
  etching an aluminum base to provide the aluminum base with a large-sized surface layer;
  carrying out a chemical conversion process for the large-sized surface layer to provide the large-sized surface layer with a dielectric coat;

partially removing the large-sized surface layer and the dielectric coat to expose a part of the aluminum base, wherein the anode lead portion essentially consists of the exposed part of the aluminum base.

7. The method according to claim 6, wherein the formation of the cathode portion is carried out so that the cathode portion is formed on the dielectric coat of the large-sized surface layer.

8. The method according to claim 6, further comprising providing at least one of the anode lead portion and the inner anode electrode with a metal bump so that the anode lead portion and the inner anode electrode are connected with each other by using the metal bump through a lead-bonding process.

9. The method according to claim 8, wherein the metal bump is made of aluminum or gold.

10. The method according to claim 1, further comprising carrying out an additional chemical conversion process to provide the anode lead portion with an additional dielectric coat, wherein the additional chemical conversion process is carried out after the formation of the anode lead portion before the formation of the cathode portion.

11. A solid electrolytic capacitor device comprising a package substrate and a capacitor element mounted on the package substrate, the package substrate comprising an outer anode electrode, an outer cathode electrode, an inner anode electrode and an inner cathode electrode, the outer anode electrode being electrically connected to the inner anode electrode, the outer cathode electrode being electrically connected to the inner cathode electrode, the capacitor element comprising a capacitor body and an anode lead portion, the capacitor body having a surface at least one part of which is provided with a cathode portion, the cathode portion being connected to the inner cathode electrode, the anode lead portion extending from the capacitor body and being made of aluminum, the anode lead portion being connected to the inner anode electrode.

12. The solid electrolytic capacitor device according to claim 11, wherein the anode lead portion is connected to the inner anode electrode by a lead-bonding process.

13. The solid electrolytic capacitor device according to claim 11, wherein the capacitor body is obtained by the steps of: etching an aluminum base to provide the aluminum base with a large-sized surface layer; carrying out a chemical conversion process for the large-sized surface layer to provide the large-sized surface layer with a dielectric coat; partially removing the large-sized surface layer and the dielectric coat to expose a part of the aluminum base; and forming the cathode portion on the dielectric coat of the large-sized surface layer, wherein the anode lead portion comprises the exposed part of the aluminum base and an aluminum wire which is connected to the exposed part of the aluminum base.

14. The solid electrolytic capacitor device according to claim 11, wherein the capacitor body is obtained by the steps of: etching an aluminum base to provide the aluminum base with a large-sized surface layer; carrying out a chemical conversion process for the large-sized surface layer to provide the large-sized surface layer with a dielectric coat; partially removing the large-sized surface layer and the dielectric coat to expose a part of the aluminum base; and forming the cathode portion on the dielectric coat of the large-sized surface layer, wherein the anode lead portion essentially consists of the exposed part of the aluminum base.

15. The solid electrolytic capacitor device according to claim 14, wherein at least one of the anode lead portion and the inner anode electrode is provided with a metal bump, the anode lead portion and the inner anode electrode being connected with each other by using the metal bump through a lead-bonding process.

16. The solid electrolytic capacitor device according to claim 15, wherein the metal bump is made of aluminum or gold.

17. The solid electrolytic capacitor device according to claim 11, wherein the anode lead portion is provided with an additional dielectric coat.

18. The solid electrolytic capacitor device according to claim 11, wherein the cathode portion is formed after the formation of anode lead portion.

* * * * *